United States Patent
Myers et al.

(12) 
(10) Patent No.: US 6,809,054 B1
(45) Date of Patent: Oct. 26, 2004

(54) FCC SPENT CATALYST DISTRIBUTOR

(75) Inventors: Daniel N. Myers, Arlington Heights, IL (US); Mikhail Tretyak, Arlington Heights, IL (US); Rusty M. Pittman, Chicago, IL (US); Steven Niewiedzial, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 726 days.

(21) Appl. No.: 09/717,741

(22) Filed: Nov. 21, 2000

(51) Int. Cl.[7] .......................... B01J 20/34; B01J 38/30
(52) U.S. Cl. .......................... 502/41; 502/34; 502/39
(58) Field of Search .......................... 502/41, 34, 39

(56) References Cited

U.S. PATENT DOCUMENTS

| | | | |
|---|---|---|---|
| 4,150,090 A | 4/1979 | Murphy et al. | 422/144 |
| 4,199,435 A | 4/1980 | Chessmore et al. | 208/113 |
| 4,220,623 A | 9/1980 | Jahnke et al. | 422/144 |
| 4,235,704 A | 11/1980 | Luckenbach | 208/113 |
| 4,300,997 A | 11/1981 | Meguerian et al. | 208/120 |
| 4,309,309 A | 1/1982 | Blanton, Jr. | 252/417 |
| 4,313,848 A | 2/1982 | Scott | 252/418 |
| 4,325,833 A | 4/1982 | Scott | 252/417 |
| 4,350,615 A | 9/1982 | Meguerian et al. | 252/455 Z |
| 4,413,573 A | 11/1983 | Hall et al. | 110/347 |
| 4,419,221 A | 12/1983 | Castagnos, Jr. et al. | 208/113 |
| 4,431,749 A | 2/1984 | Hettinger, Jr. et al. | 502/68 |
| 4,434,147 A | 2/1984 | Dimpfl et al. | 423/235 |
| 4,521,389 A | 6/1985 | Blanton, Jr. et al. | 423/235 |
| 4,541,922 A | 9/1985 | Lomas et al. | 208/164 |
| 4,541,923 A | 9/1985 | Lomas et al. | 208/164 |
| 4,542,114 A | 9/1985 | Hegarty | 502/39 |
| 4,615,992 A | 10/1986 | Murphy | 502/41 |
| 4,828,680 A | 5/1989 | Green et al. | 208/120 |
| 4,988,432 A | 1/1991 | Chin | 208/121 |
| 4,991,521 A | 2/1991 | Green et al. | 110/347 |
| 5,002,654 A | 3/1991 | Chin | 208/121 |
| 5,006,495 A | 4/1991 | Pappal et al. | 502/42 |
| 5,015,362 A | 5/1991 | Chin | 208/121 |
| 5,156,817 A | 10/1992 | Luckenbach | 422/144 |
| 5,635,140 A | 6/1997 | Miller et al. | 422/144 |
| 5,773,378 A | 6/1998 | Bussey et al. | 502/41 |

OTHER PUBLICATIONS

Joseph Wilson and Chris Ross, *FCC Revamp Improves Operations at Australian Refinery*, Oil & Gas Journal, Oct. 25, 1999, at 63.

Primary Examiner—Stanley S. Silverman
Assistant Examiner—Jonas N Strickland
(74) Attorney, Agent, or Firm—John G. Tolomei; James C. Paschall; Thomas K. McBride, Jr.

(57) ABSTRACT

An distributor arrangement introduces spent FCC catalyst more uniformly across the dense bed of the regenerator to provide more even contact with regeneration gas in order to avoid hot spots and zones of incomplete combustion. The invention forms a fluidized hopper to collect spent catalyst and a horizontally extended header with multiple horizontally extended outlet arms to place catalyst into the regenerator. The invention may use an aeration means to fluidize the header to further assist catalyst flow. Furthermore, the spent catalyst delivered to the top of the regenerator dense reduces $NO_x$ emissions in the flue gas.

8 Claims, 4 Drawing Sheets

FCC SPENT CATALYST DISTRIBUTOR

BACKGROUND OF THE INVENTION

1. Field of the Invention

This invention relates generally to the dispersing of fluidized solids into a vessel. More specifically, this invention relates to a method and apparatus for distributing a stream of spent fluidized cracking catalyst particles into a regenerator for carbon removal.

2. Description of the Prior Art

There are a number of continuous cyclical processes employing fluidized solid techniques in which carbonaceous materials are deposited on the solids in a contacting zone and the solids are conveyed during the course of the cycle to another zone where carbon deposits are at least partially removed by combustion in an oxygen-containing medium. The solids from the latter zone are subsequently withdrawn and reintroduced in whole or in part to the contacting zone.

One of the more important processes of this nature is the fluid catalytic cracking (FCC) process for the conversion of relatively high boiling point hydrocarbons to lighter boiling hydrocarbons in the heating oil or gasoline (or lighter) range. In the FCC process, hydrocarbon feed is contacted in one or more reaction zones with a particulate cracking catalyst maintained in a fluidized state under conditions suitable for the conversion of hydrocarbons. The heavy hydrocarbons in the feed crack to lighter hydrocarbons. During cracking carbonaceous hydrocarbons or "coke" deposit on the catalyst to yield "coked" or "spent" catalyst. The cracked products are then separated from the coked catalyst. The coked catalyst is then stripped of volatiles, usually by steam, and then is regenerated in a catalyst regenerator. In the regenerator, the coke is burned from the catalyst with oxygen containing gas, usually air. Flue gas formed by burning the coke in the regenerator may be treated for removal of particulates and conversion of carbon monoxide, after which the flue gas is normally discharged into the atmosphere.

Emphasis on the environmental importance of reduced $NO_x$ formation in flue gas has prompted much work in various areas. $NO_x$, or oxides of nitrogen, comes mainly from the oxidation of nitrogen compounds in the hydrocarbon feed, with perhaps some slight additional nitrogen fixation, or conversion to $NO_x$ of nitrogen in regenerator air.

Although all FCC regenerators produce some $NO_x$, the problem is more severe in bubbling bed regenerators, as opposed to high efficiency regenerators. High efficiency regenerators burn most of the coke in a fast-fluidized bed coke combustor. Such regenerators have few poorly fluidized regions. Bubbling bed regenerators may have poorly fluidized regions and will have large bubbles of air passing through the bed, leading to localized areas of high oxygen concentration. Although the reasons for the different $NO_x$ emissions in these two types of regenerators are perhaps not completely understood, all agree that $NO_x$ emissions are usually significantly higher, frequently twice as high, from bubbling bed regenerators.

One area of work on $NO_x$ reduction pertains to flue gas treatment methods that are isolated from the FCC process unit. With flue gas treatment, it is known to react $NO_x$ in flue gas with $NH_3$. $NH_3$ is a selective reducing agent, which does not react rapidly with the excess oxygen, which may be present in the flue gas. Two types of $NH_3$ processes have evolved—thermal and catalytic. Thermal processes, such as the Exxon Thermal DENOX process, generally operate as homogeneous gas-phase processes at very high temperatures, typically around 840° to 1040° C. The catalytic systems that have been developed operate at much lower temperatures, typically at 150° to 450° C. These temperatures are typical of flue gas streams. Unfortunately, the catalysts used in these processes are readily fouled, or the process equipment plugged, by catalyst fines that are an integral part of FCC regenerator flue gas. U.S. Pat. No. 521,389 and U.S. Pat. No. 434,147 disclose adding $NH_3$ to $NO_x$-containing flue gas to catalytically reduce the $NO_x$ to nitrogen. U.S. Pat. No. 5,015,362 taught reducing $NO_x$ emissions by contacting flue gas with sponge coke or coal, and a catalyst effective for promoting reduction of $NO_x$ in the presence of such carbonaceous substances.

Flue gas treatment methods are effective, but the capital and operating costs are high. Therefore, the alternative areas within the FCC process unit itself should be examined, which include feed treatment, catalytic approaches, and process approaches.

First, some refiners now go to the expense of hydrotreating feed. This is usually done more to meet sulfur specifications in various cracked products, or a $SO_x$ limitation in regenerator flue gas rather than a $NO_x$ limitation. Hydrotreating will reduce to some extent the nitrogen compounds in FCC feed, and this will help reduce the $NO_x$ emissions from the regenerator. Again, there is typically a high cost for this procedure and it can usually only be justified for sulfur removal.

Second, there are catalytic approaches to $NO_x$ control. These approaches are generally directed at special catalysts which promote CO afterburning, but which do not promote formation of as much $NO_x$. U.S. Pat. Nos. 4,300,997 and 4,350,615 are both directed to use of a Pd—Ru CO-combustion promoter. The bimetallic CO combustion promoter is reported to do an adequate job of converting CO to $CO_2$, while minimizing the formation of $NO_x$. U.S. Pat. No. 4,199,435 suggests steam treating a conventional metallic CO combustion promoter to decrease $NO_x$ formation without impairing too much the CO combustion activity of the promoter. U.S. Pat. No. 4,235,704 indicates too much CO combustion promoter causes $NO_x$ formation, and calls for monitoring the $NO_x$ content of the flue gases, and adjusting the concentration of CO combustion promoter in the regenerator based on the amount of $NO_x$ in the flue gas. As an alternative to adding less CO combustion promoter, the patent suggests deactivating it in place, by adding something to deactivate the Pt, such as lead, antimony, arsenic, tin or bismuth. U.S. Pat. No. 5,002,654 taught the effectiveness of a zinc-based additive in reducing $NO_x$. Relatively small amounts of zinc oxides impregnated on a separate support having little or no cracking activity produced an additive which could circulate with the FCC equilibrium catalyst and reduce $NO_x$ emissions from FCC regenerators. U.S. Pat. No. 4,988,432 taught the effectiveness of an antimony-based additive at reducing $NO_x$.

However, many refiners are reluctant to add additional metals to their FCC units out of environmental concerns. One concern is that some additives, such as zinc, may vaporize under some conditions experienced in FCC units. Many refiners are concerned about adding antimony to their FCC catalyst inventory. Such additives would also add to the cost of the FCC process and would dilute the FCC equilibrium catalyst to some extent.

Thirdly and finally, there are process approaches. Process modifications are suggested in U.S. Pat. Nos. 4,413,573 and 4,325,833 directed to two-and three-stage FCC regenerators, which reduce $NO_x$ emissions. U.S. Pat. No. 4,313,848 teaches countercurrent regeneration of spent FCC catalyst, without backmixing, to minimize $NO_x$ emissions. U.S. Pat. No. 4,309,309 teaches adding a vaporizable fuel to the upper portion of a FCC regenerator to minimize $NO_x$ emissions. Oxides of nitrogen formed in the lower portion of the regenerator are reduced in the reducing atmosphere generated by burning fuel in the upper portion of the regenerator. U.S. Pat. No. 4,542,114 minimized the volume of flue gas by using oxygen rather than air in the FCC regenerator, with consequent reduction in the amount of flue gas produced.

In U.S. Pat. No. 4,828,680, $NO_x$ emissions from a FCC unit were reduced by adding sponge coke or coal to the circulating inventory of cracking catalyst. The carbonaceous particles selectively absorbed metal contaminants in the feed and reduced $NO_x$ emissions in certain instances. Many refiners are reluctant to add coal or coke to their FCC units; such carbonaceous materials will burn and increase the heat release in the regenerator. Most refiners would prefer to reduce, rather than increase, heat release in their regenerators. U.S. Pat. No. 4,991,521 showed that a regenerator could be designed so that coke on spent FCC catalyst could be used to reduce $NO_x$ emissions from an FCC regenerator. The patent taught the use of a two stage FCC regenerator. Flue gas from a second regenerator stage contacted coked catalyst in a first stage. Although effective at reducing $NO_x$ emissions, this approach is not readily adaptable to existing units. Another use of coke on spent catalyst to reduce $NO_x$ was reported in U.S. Pat. No. 5,006,495. The incoming spent catalyst, or at least a portion of it, was added to the dilute phase region of a bubbling bed regenerator, so that the coke on catalyst could reduce $NO_x$ species in the dilute phase flue gas. This approach is interesting, but may increase dilute phase catalyst loading, and would require considerable unit modification.

We have found a simple, direct, and economical solution in that the apparatus and method of distributing catalyst into the regeneration vessel can dramatically affect the quality of the flue gas emissions produced upon coke combustion.

Previous art regarding catalyst distribution has focused on improved catalyst mixing in the regenerator to provide more complete and efficient catalyst regeneration. Better distribution and mixing also avoid dilute phase CO combustion or afterburning in the offgas. U.S. Pat. No. 5,773,378 disclosed a spent catalyst distributor apparatus and retrofit method to radially discharge spent catalyst and 10–50% of the regeneration air into the dense phase of the catalyst. U.S. Pat. No. 5,635,140 showed a self-aerating spent catalyst distributor to discharge catalyst radially and downwardly from a centerwell via lipped trough arms into the catalyst bed. U.S. Pat. No. 4,150,090 disclosed a similar system but included an aeration means in the trough arms to assist in fluidization and expulsion from the troughs.

An article disclosed an extension to a spent catalyst standpipe that directs catalyst into a fluidized trough located below the catalyst bed level. Joseph Wilson and Chris Ross, *FCC Revamp Improves Operations at Australian Refinery*, OIL & GAS JOURNAL, Oct. 25, 1999, at 63.

U.S. Pat. No. 4,615,992 disclosed a process for regeneration which included a horizontally placed baffle located below the catalyst bed level, and a concentric well pipe extending around a vertical standpipe.

U.S. Pat. No. 5,156,817 disclosed additional devices for discharging catalyst admixed with gas into a regeneration bed.

SUMMARY OF THE INVENTION

It is an object of this invention to provide a method and apparatus that simplifies the reducing or eliminating of non-uniformity in the delivery of particles into a fluidized particle bed within a vessel.

It is a further object of this invention to provide an apparatus and method for distributing spent catalyst uniformly onto a catalyst bed within a fluidized regenerator.

It is a further object of this invention to provide a method and apparatus that is susceptible to simple repair, replacement, or modification that provides a well dispersed spent catalyst layer across the top of a catalyst dense bed within a fluidized catalytic cracking regenerator.

It is a further object of this invention that the spent catalyst delivered to the top of the regenerator dense bed provide a curtain of coke that acts to reduce $NO_x$ to $N_2$ and $CO_2$.

The objects of this invention are achieved by a specific form of a catalyst distributor arrangement that places coked catalyst horizontally into regenerator and onto the surface of the dense phase bed. The surface of the catalyst bed is considered to be within the upper and lower fluctuations of the transition boundary from a dense fluidized catalyst phase to a dilute flue gas phase with entrained catalyst. A hydraulic head of accumulated catalyst in a fluidized hopper vessel acts to provide the driving force for catalyst transport and flow. Dispersion onto a catalyst bed takes place through a header connected with multiple outlet arms. An aeration means can assist flow within the header by providing additional fluidization gas.

Other mechanical and operational advantages can result from the incorporation of this invention. Such advantages include FCC unit debottlenecking. Since the delivery of spent catalyst is more uniform, it is possible to contain more CO burning within the catalyst bed. This reduces the amount of afterburn in the dilute phase which often limits the effectiveness or capacity of many FCC units. This allows oxygen to be used more effectively, thus increasing the coke burning capacity at the same air flow rate. An additional mechanical advantage is the ease of installation into existing regeneration vessels, which allows revamps to be accomplished within a typical existing unit turnaround schedule.

Accordingly, in one embodiment, this invention is a method of regenerating FCC catalyst in a regenerator having a spent catalyst inlet for receiving spent catalyst from a stripper and an air distribution system at a lower end of the regenerator; wherein the method comprises the following steps. First, collecting catalyst from the spent catalyst inlet in a hopper and fluidizing the collected catalyst to provide a hydraulic head to assist catalyst flow. The next step is passing the catalyst to multiple points near a surface of a dense phase catalyst bed using a horizontally extended header having a plurality of horizontally extended outlet arms. Catalyst may also be passed through an opening in the hopper to a point near the surface of the catalyst bed. The next step is contacting the catalyst with fluidization gas in the regenerator to burn off at least part of the coke present on the spent catalyst. Finally, a regenerated catalyst is produced which then can be recovered from a dense phase of the catalyst bed. In preferred embodiments the hopper is fluidized with an air distributor located at the bottom of the hopper, and the header is fluidized with a means for aeration such as an aeration lance inserted into the header to further assist catalyst flow. The fluidization gas preferably comprises air. The top of the hopper is open to the regenerator. The method further preferably includes the step of producing a recovered off gas, or regenerator flue gas, containing reduced $NO_x$ as a result of the improved catalyst distribution.

In an apparatus embodiment, this invention has a hopper, an air distributor located at the bottom of the hopper, and a horizontally extended header having a plurality of horizontally extended outlet arms for placing catalyst near the top surface of the catalyst bed within a FCC regenerator. The header is in communication with the hopper. When this apparatus is installed in a regenerator having a spent catalyst standpipe, the hopper is in communication with the spent catalyst standpipe and the header is fixed with respect to the wall of the regenerator. The hopper also contains an outlet on its side in order to pass a portion of the catalyst near the top surface of the bed. In preferred embodiments, the header further comprises a means for aeration, which can be further characterized as an aeration lance with a plurality of orifices. The hopper is open at the top to provide an alternate contingency means for catalyst transport into the regenerator. The outlet arms may be arranged at various angles and places on the header, with a preferred angle range being 30 to 150 degrees, and an especially preferred angle range being 55 to 100 degrees. Drains may also be placed in the header to permit additional alternative pathways for catalyst flow to the regenerator.

Additional objects, embodiments, and details of this invention can be obtained from the following "detailed description".

DETAILED DESCRIPTION OF THE INVENTION

Figure 1:
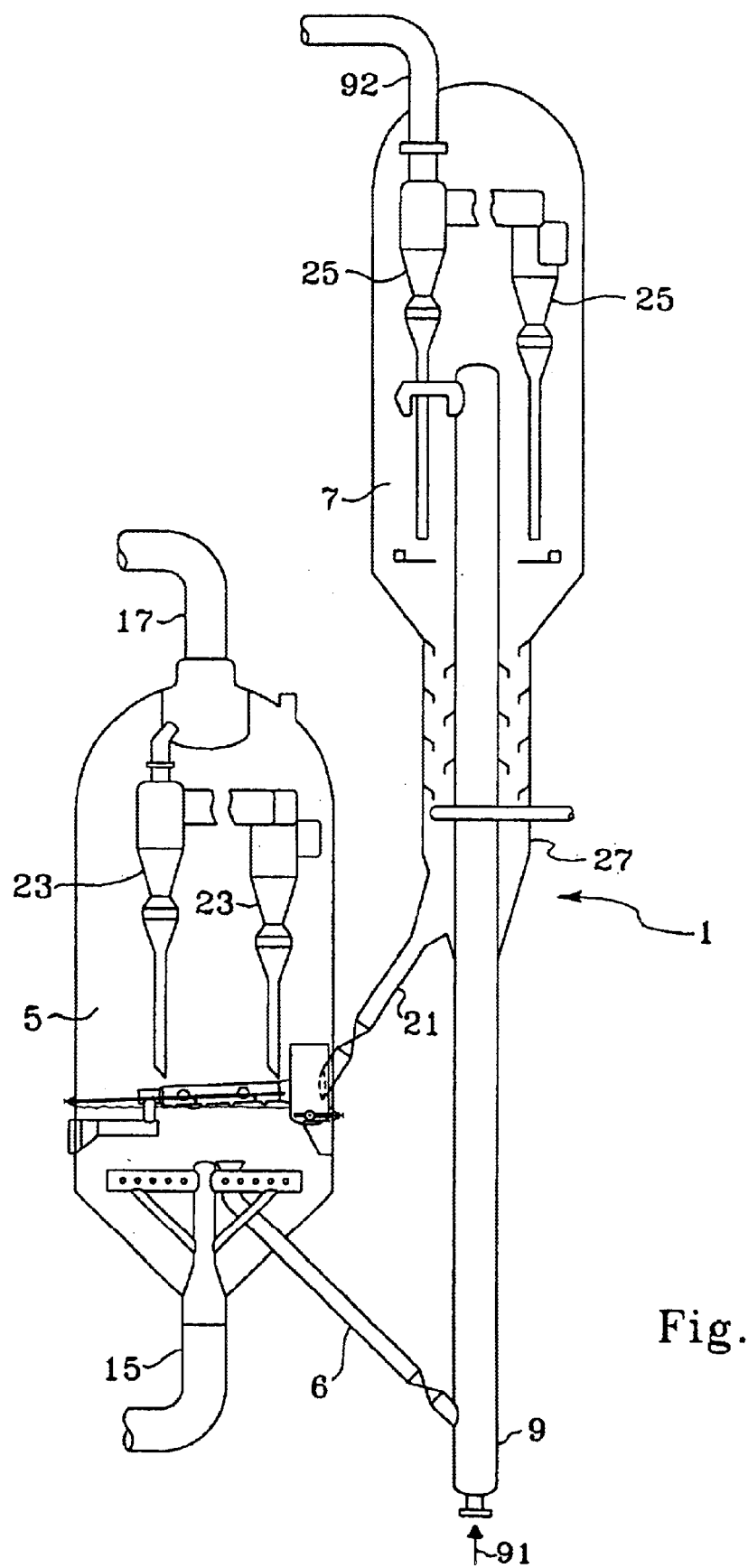
FIG. 1 is a schematic elevational view of an FCC process incorporating the present invention.

An FCC process unit, generally referred to with reference numeral 1 and shown schematically in FIG. 1, generally comprises two main zones for reaction and regeneration. A reaction zone is usually comprised of a vertical conduit, or riser 9, as the main reaction site, with the effluent of the conduit emptying into a large volume process vessel, which may be referred to as a separation vessel 7. In the reaction zone, a feed stream 91 is contacted with a finely divided fluidized catalyst at an elevated temperature and at a moderate positive pressure. The feed stream 91 to the FCC unit consists of a mixture of hydrocarbons having boiling points above about 232° C. In the riser, feed is contacted with a relatively large fluidized bed of catalyst. The residence time of catalyst and hydrocarbons in the riser needed for substantial completion of the cracking reactions is only a few seconds. The flowing vapor/catalyst stream leaving the riser 9 passes from the riser to a solids-vapor separation device, known as a cyclone 25, normally located within and at the top of the separation vessel 7. The products of the reaction are separated from a portion of catalyst which is still carried by the vapor stream by means of the cyclone 25 and the products are vented from the cyclone 25 and separation vessel 7 via line 92. The spent catalyst falls downward to a stripper 27 located in a lower part of the separation vessel 7. Catalyst is transferred to a regeneration vessel 5 by way of a conduit 21 connected to the stripper 27.

The reaction zone is maintained at high temperature conditions which generally include a temperature above about 427° C. and a pressure of from about 69 to 517 kPa (gauge). The catalyst/oil ratio, based on the weight of catalyst and feed hydrocarbons entering the bottom of the riser, may range between about 4:1 and about 20:1. The average residence time of catalyst in the riser is preferably less than about 5 seconds. The type of catalyst employed in the process may be chosen from a variety of commercially available catalysts. A catalyst comprising a zeolitic base material is preferred, but the older style amorphous catalyst can be used if desired. Further information on the operation of FCC reaction zones may be obtained from U.S. Pat. No. 4,541,922 and U.S. Pat. No. 4,541,923 and the patents cited above.

In the FCC process again as illustrated in FIG. 1, the catalyst is continuously circulated from the reaction zone to the regeneration vessel 5 and then again to the reaction zone. The catalyst therefore acts as a vehicle for the transfer of heat from zone to zone as well as providing the necessary catalytic activity. Catalyst employed in the reaction zone which is being transferred to the regeneration zone for the removal of coke deposits is referred to as "spent catalyst". The term "spent catalyst" is not intended to be indicative of a total lack of catalytic activity by the catalyst particles. Catalyst, which is being withdrawn from the regeneration vessel 5, is referred to as "regenerated" catalyst. The spent catalyst being charged to the regeneration zone via conduit 21 may contain from about 0.2 to about 5 wt-% coke. This coke is predominantly comprised of carbon and can contain from about 5 to 15 wt-% hydrogen, as well as sulfur and other elements. The catalyst charged to the regeneration zone enters a regeneration vessel in which it is brought into contact with an oxygen-containing regeneration gas 15 such as air or oxygen-enriched air under conditions which result in combustion of the coke.

The regeneration vessel 5 is normally operated at a temperature of from about 500° to about 900° C., more usually between 600° to 750° C. The operating pressure is preferably from about 34 to about 517 kPa (gauge). Additional information on the operation of FCC regeneration zones may be obtained from U.S. Pat. Nos. 4,431,749, 4,419,221 and 4,220,623.

Combustion of coke raises the temperature of the catalyst and produces regenerated catalyst which exits via a withdrawal conduit 6 and a flue gas which exits via line 17 containing carbon monoxide, carbon dioxide, water, nitrogen, and perhaps a small quantity of oxygen. Flue gas is separated from entrained regenerated catalyst by the cyclone 23 separation device located within the regeneration vessel 5 and exits the regeneration vessel 5 by line 17. Regenerated catalyst which was separated from the flue gas is returned to the lower portion of the regeneration zone which typically is maintained at a higher catalyst density. A stream of regenerated catalyst leaves the regeneration zone via the withdrawal conduit 6 and, as previously mentioned, contacts the feed stream 91 in the reaction zone.

As known to those skilled in the art, the regeneration vessel 5 may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 320 kg/m³. In a similar manner, the term "dense phase" is intended to mean that the catalyst/gas mixture has a density equal to or more than 320 kg/m³. Representative dilute phase operating conditions often include a catalyst/gas mixture having a density of about 16 to 160 kg/m³.

Figure 2:
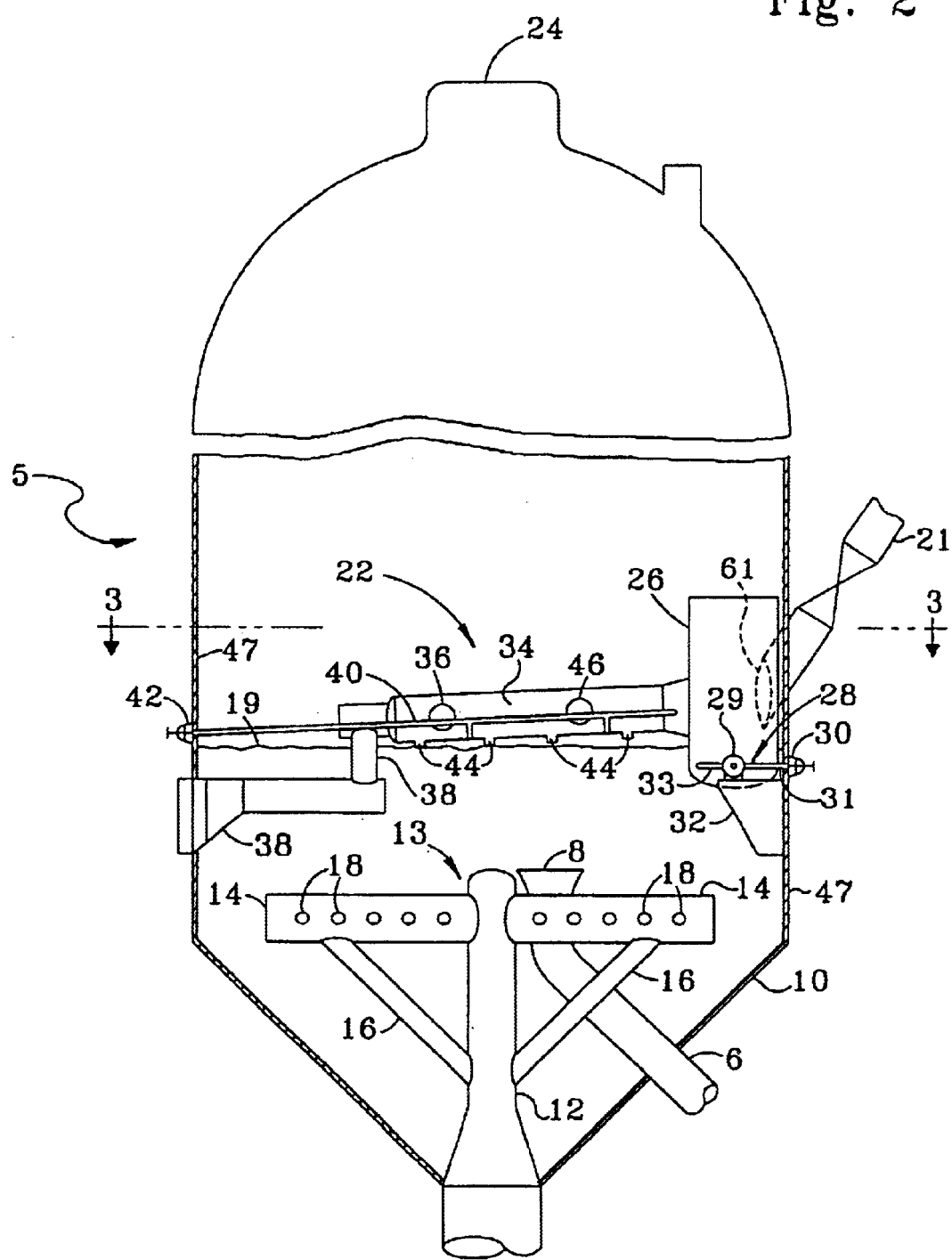
FIG. 2 is a schematic elevational view of the regenerator of the present invention.
Figure 3:
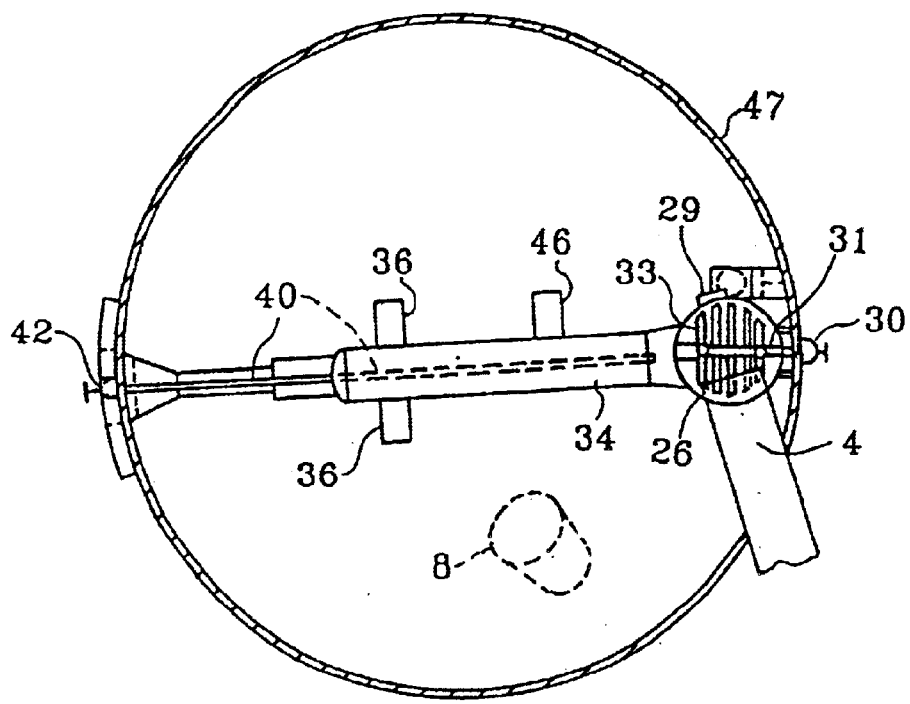
FIG. 3 is a cross-sectional view of the regenerator taken along segment 3—3 in FIG. 2.

FIGS. 2 and 3 show regeneration vessel 5 of the FCC unit 1 in detail. Discussion of the regeneration vessel will first proceed with reference to FIG. 2. Cyclones 23 with connecting diplegs normally positioned in the upper portion of a regeneration vessel 5 are not shown to simplify the drawing. A catalyst inlet conduit 4 is provided for introducing spent catalyst containing carbonaceous deposits from the stripper 27 to the regeneration vessel via the conduit 21. A valve in the standpipe controls catalyst flow. The conduit 4 may be positioned to provide for tangential introduction of the finely divided catalyst particles to the regeneration vessel 5. The wavy line indicates a top surface of a dense phase catalyst bed 19. The top surface of the dense phase catalyst bed 19 is within the upper and lower fluctuations of the transition boundary from a dense fluidized catalyst phase to a dilute flue gas phase with entrained catalyst. A conduit 6 extending upwardly into the vessel and terminating in a conical inlet 8 above a regenerator gas distributor grid 13 provides means for withdrawing regenerated catalyst from the vessel 5. The regeneration vessel 5 is provided with a conical bottom 10. A regeneration gas inlet conduit or manifold 12 concentrically extends upwardly through the conical bottom of the vessel and terminates at a level substantially coinciding with the lowest vertical wall portion of the vessel 5. A plurality of conduits 14 extends substantially horizontally outwardly from the concentric manifold 12 to provide the distributor grid 13. Support conduits 16 in open communication with conduits 12 and 14 provide structural support to the grid means in addition to providing additional regeneration gas to outer portions of each segment of the distributor grid 13. Pipes 18 horizontally extend substantially at right angles to conduits 14.

In the apparatus of FIG. 2, the regeneration gas enters the bottom of the vessel by vertically extending manifold 12 and passes out through conduits 16 and 14 to distributor pipes 18. The regenerating gas passed to pipes 18 then passes out through holes or nozzles along the bottom surface of the pipes and then upwardly through the bed 19 of catalyst to be regenerated under dense fluid phase regeneration conditions. Regenerated catalyst is withdrawn from the vessel above the grid by the inlet 8 communicating with conduit 6. The inlet to withdrawal conduit 6 may be as shown in FIG. 2 or it may be extended upwardly into the vessel so that regenerated catalyst is withdrawn from an upper portion of the dense fluid bed 19 of catalyst rather than a lower portion thereof as shown. Regeneration gas after passing through suitable cyclone separators not shown and positioned in an upper portion of the regenerator passes into a plenum chamber not shown and then out the top of the regeneration vessel through opening 24 to line 17.

Figure 4:
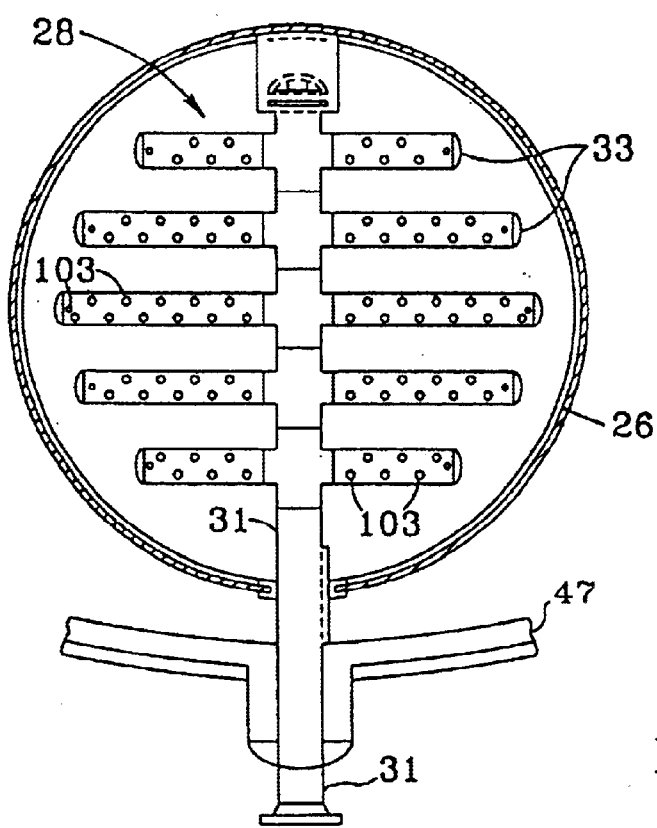
FIG. 4 is an enlarged bottom view of the hopper air distributor.
Figure 5:
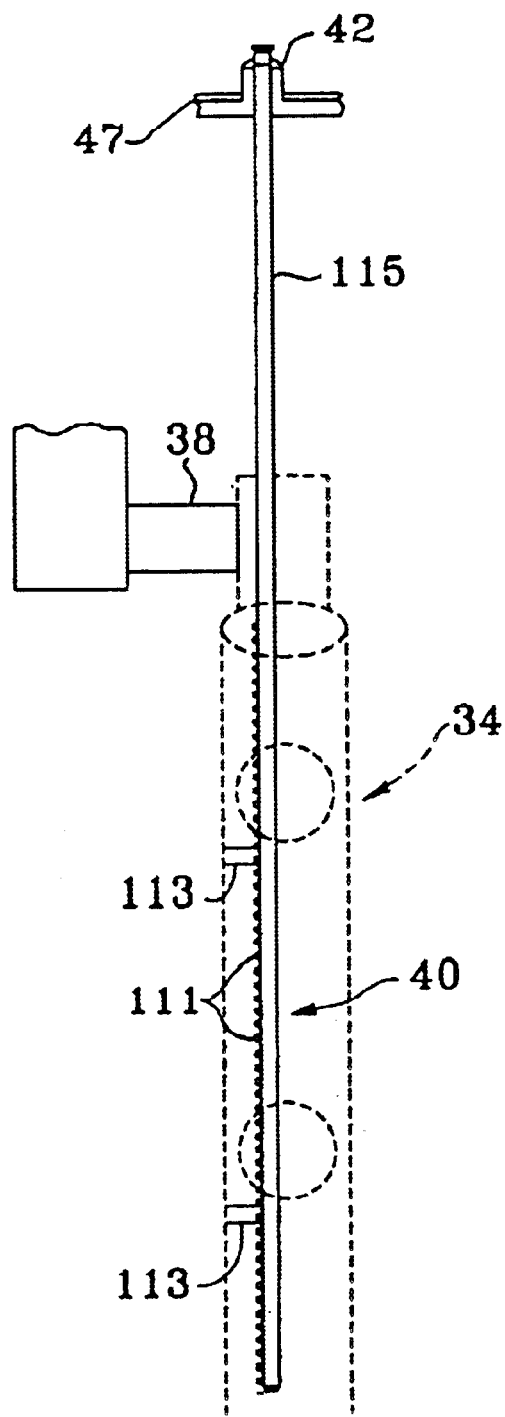
FIG. 5 is an enlarged side view of the header aeration lance.

The catalyst distributor of the present invention is generally referenced with numeral 22. Spent catalyst is collected in a vertically extending hopper 26 from catalyst inlet conduit 4 and fluidized with an air distributor 28. FIG. 4 illustrates enlarged details of the air distributor 28. The hopper air distributor 28 receives gas from through a conduit 31 that passes through the regenerator wall 47 and the side of the hopper 26. A plurality of conduits 33 may extend horizontally from the conduit 31 to provide a grid located at the bottom of the hopper 26. Gas may then pass out through holes 103 or nozzles along the bottom surface of the conduits 33 and then upwardly through the hopper 26. The holes 103 or nozzles may also be configured by any means known to the art, for example as alternating recessed angled jets, dual offset jet nozzles, or single nozzles descending linearly from any angle desired, such that the main function of transferring fluidization gas occurs with a minimum of catalyst damage. The hopper 26 provides a hydraulic head to pass catalyst down a horizontally extended header 34 and out a plurality of horizontally extended outlet arms 36 and 46 and thereby onto multiple points on the surface of a dense catalyst bed 19. The hopper 26 can be affixed to a wall 47 of the regenerator with a support 32. The hopper 26 may also contain an outlet 29 which also allows catalyst to pass to a point near the top of a surface of the dense phase bed. The top of the hopper is open and in communication with the regeneration vessel. The hopper top provides an alternative contingency path into the regenerator as well as provides pressure equalization between the catalyst conduit 21 and the regeneration vessel 5. The header 34 may also be fixed to the regenerator wall 47, as shown by header support bracket 38. In a preferred embodiment, the header is fluidized by an aeration lance 40 shown in dashed lines in FIG. 3. Furthermore, FIG. 5 illustrates enlarged details of the aeration lance 40. The lance is shown within the header 34, which has been shown in dashed lines for illustrative purposes in FIG. 5. The aeration lance 40 contains a plurality of orifices or nozzles 111 to introduce fluidization gas to further assist in catalyst transport from the hopper to the outlet arms. These orifices or nozzles 111 may be configured by any means know to the air distribution art, which allows fluidization gas to pass through. Alternating nozzle jets may be used to effect the gas transfer from the bottom side of the lance, where every other nozzle 111 typically contains a small downwardly angled jet insert. Gas is passed through conduit 115 which goes through the regenerator wall 47 and into the header 34. The header support bracket 38 and brackets 113 that support the aeration lance are also shown in FIG. 5. A control valve in line 42 also regulates airflow to the header aeration lance 40. In an alternate preferred embodiment, means for aeration of the header may be achieved by extending the hopper air distributor conduit 31 into the header 34, and providing the conduit extension with at least one orifice or nozzle to introduce fluidization gas directly into the header. Finally, downwardly projecting drains 44 are located in the header beneath the outlet arms.

FIG. 3 illustrates a cross-sectional view of the catalyst distributor. The drawing has been simplified by eliminating the regenerator gas distributor grid 13. Three outlet arms 36, 46 are shown which intersect the header 34 at an angle of 90 degrees from the direction of catalyst flow. An alternative angle of 60 degrees also would provide excellent flow in an alternative preferred embodiment. The outlet arms 36, 46 are shown as tubular piping conduits similar to the header 34. One set of outlet arms 36 is symmetrically branched occupying both sides of the header. Another outlet arm 46 is placed only on one side of the header 34 in an asymmetric manner opposite to the axial location of the inlet 8 for the regenerated catalyst withdrawal This configuration allows for uniform mixing when the inlet 8 for regenerated catalyst withdrawal is located beneath the other side of the header 34 as shown.

The operation of the catalyst distributor proceeds via the steps of collecting catalyst from the spent catalyst inlet 61 in the hopper 26. The air distributor 28 fluidizes the catalyst and passes the catalyst into the header 34. The catalyst passes through the plurality of outlet arms 36 and 46 of the header 34 onto multiple points on or near a surface of a dense phase catalyst bed 19. Catalyst may also be passed from the hopper 26 through the outlet 29 onto or near the surface of the dense phase catalyst bed 19. The catalyst then contacts regeneration gas to produce a regenerated catalyst along with an off gas having reduced $NO_x$ content.

This invention has been presented with reference to the drawings. These depict particular embodiments of the invention and are not intended to limit the generally broad scope of the invention as set forth in the claims.

What is claimed is:

1. A method of regenerating spent FCC catalyst in a regenerator having a spent catalyst inlet and a fluidization gas distribution system at a lower end of the regenerator, said method comprising:
   a) collecting catalyst from the spent catalyst inlet in a hopper;
   b) fluidizing the collected catalyst in the hopper to provide a hydraulic head;
   c) passing catalyst to multiple points near a surface of a dense phase catalyst bed using a horizontally extended header having a plurality of horizontally extended outlet arms;
   d) contacting the catalyst with fluidization gas in the regenerator to burn off at least part of the coke present on the spent catalyst to produce regenerated catalyst; and
   e) recovering regenerated catalyst from the dense phase of the catalyst bed.

2. The method of claim 1 wherein step b) is performed with an air distributor located at the bottom of the hopper.

3. The method of claim 1 further comprising the step of fluidizing the header using an aeration lance to assist catalyst flow from the hopper to the outlet arms.

4. The method of claim 1 further comprising the step of passing catalyst to a dilute phase within the upper part of the regenerator through an opening in the top of the hopper.

5. The method of claim 1 further comprising the step of passing catalyst through an outlet in the side of the hopper to a point near the surface of the dense phase catalyst bed.

6. The method of claim 1 wherein the fluidization gas comprises air.

7. The method of claim 1 wherein the surface of the catalyst bed in step c) is within the upper and lower fluctuations of the transition boundary from a dense fluidized catalyst phase to a dilute flue gas phase with entrained catalyst.

8. The method of claim 1 further comprising the step of producing a recovered flue gas from the regenerator having a reduced $NO_x$ content.

* * * * *